United States Patent
Asai (10) Patent No.: US 9,041,965 B2
(45) Date of Patent: May 26, 2015

(54) INFORMATION PROCESSING RELATED TO WIRELESS SETTING FOR WIRELESS COMMUNICATION USING FIRST TYPE INTERFACE SECTION WITH FIRST COMMUNICATION PROTOCOL AND USING SECOND TYPE INTERFACE SECTION WITH SECOND COMMUNICATION PROTOCOL

(71) Applicant: Norihiko Asai, Tajimi (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/139,900

(22) Filed: Dec. 24, 2013

(65) Prior Publication Data

US 2014/0176980 A1 Jun. 26, 2014

(30) Foreign Application Priority Data

Dec. 26, 2012 (JP) ................................ 2012-282642

(51) Int. Cl.
*G06F 3/12* (2006.01)
*H04B 5/00* (2006.01)
(Continued)

(52) U.S. Cl.
CPC ........... *H04W 4/008* (2013.01); *G06K 15/4045* (2013.01); *H04W 76/021* (2013.01); *H04N 2201/3273* (2013.01); *H04N 2201/3204* (2013.01); *H04N 2201/006* (2013.01); *H04N 1/00222* (2013.01); *H04N 1/00307* (2013.01); *H04N 1/32117* (2013.01); *H04N 2201/0036* (2013.01); *H04N 2201/0039* (2013.01); *H04N 2201/0081* (2013.01);

(Continued)

(58) Field of Classification Search
None
See application file for complete search history.

(56) References Cited

U.S. PATENT DOCUMENTS

| 2006/0258289 | A1* | 11/2006 | Dua | 455/41.3 |
|---|---|---|---|---|
| 2008/0261640 | A1* | 10/2008 | Yoshida | 455/517 |
| 2009/0066998 | A1* | 3/2009 | Kato | 358/1.15 |
| 2010/0188695 | A1* | 7/2010 | Okigami | 358/1.15 |

(Continued)

FOREIGN PATENT DOCUMENTS

| JP | 2007-166538 A | 6/2007 |
|---|---|---|
| JP | 2011-146991 A | 7/2011 |

(Continued)

OTHER PUBLICATIONS

Wi-Fi Alliance Technical Committee P2P Task Group, "Wi-Fi Peer-to-Peer (P2P) Technical Specification", Version 1.1, pp. 1-159, 2010.

*Primary Examiner* — King Poon
*Assistant Examiner* — Vincent Peren
(74) *Attorney, Agent, or Firm* — Banner & Witcoff, Ltd.

(57) ABSTRACT

An information processing apparatus may communicate with a communication-target device, which is a device with which the information processing apparatus is to communicate, via a first type interface section. The information processing apparatus may store, in a first storage area, target identification information for identifying the communication-target device as default identification information, in a case where a first network to which the communication-target device belongs is identical to a second network to which the information processing apparatus belongs via the second type interface section. The target identification information may be stored in association with at least one of a plurality of attributes. The information processing apparatus may cause the target identification information not to be stored in the first storage area as the default identification information in a case where the first network is not identical to the second network.

9 Claims, 8 Drawing Sheets (51) Int. Cl.
*H04B 7/00* (2006.01)
*H04W 4/00* (2009.01)
*G06K 15/00* (2006.01)
*H04W 76/02* (2009.01)
*H04N 1/00* (2006.01)
*H04N 1/32* (2006.01)

(52) U.S. Cl.
CPC .............. *H04N 2201/0094* (2013.01); *H04N 2201/3278* (2013.01); *H04N 2201/0082* (2013.01); *H04N 2201/3205* (2013.01); *H04N 2201/3208* (2013.01)

(56) References Cited

U.S. PATENT DOCUMENTS

| | | |
|---|---|---|
| 2011/0177780 A1 | 7/2011 | Sato et al. |
| 2011/0317211 A1 | 12/2011 | Yamada et al. |
| 2012/0013927 A1* | 1/2012 | Asai ............................ 358/1.13 |
| 2012/0326962 A1 | 12/2012 | Asai |
| 2013/0141747 A1* | 6/2013 | Oba et al. .................... 358/1.14 |

FOREIGN PATENT DOCUMENTS

| | | |
|---|---|---|
| JP | 2012-038291 A | 2/2012 |
| JP | 2013-030147 A | 2/2013 |

* cited by examiner

INFORMATION PROCESSING RELATED TO WIRELESS SETTING FOR WIRELESS COMMUNICATION USING FIRST TYPE INTERFACE SECTION WITH FIRST COMMUNICATION PROTOCOL AND USING SECOND TYPE INTERFACE SECTION WITH SECOND COMMUNICATION PROTOCOL

CROSS-REFERENCE TO RELATED APPLICATIONS

This application claims priority to Japanese Patent Application No. 2012-282642, filed on Dec. 26, 2012, the contents of which are hereby incorporated by reference into the present application.

TECHNICAL FIELD

The technology disclosed in this specification relates to an information processing apparatus for communicating with devices.

BACKGROUND ART

A technology for two communication devices to conduct a wireless communication is known. With the known technology, the two communication devices conduct communication of a wireless setting according to a short-distance wireless communication (that is, a wireless communication according to a Near Field Communication (NFC) protocol). The foregoing wireless setting is a setting for conducting the wireless communication according to a communication protocol (for example, IEEE802.11a, 802.11b) which is different from the NFC protocol. Consequently, the two communication devices can conduct the wireless communication according to the wireless setting.

Moreover, a technology of storing a once-set wireless setting, and using the stored wireless setting upon re-establishing the wireless communication is also known.

SUMMARY

When setting a wireless communication (e.g.: IEEE802.11a) according to NFC, there are cases where a one-time wireless setting is set. The one-time wireless setting is a wireless setting which uses different information each time the wireless communication is established. Since the one-time wireless setting cannot be used upon reestablishing the wireless communication, storage of the one-time wireless setting is a futile operation.

In one aspect of the teachings disclosed herein, a non-transitory computer-readable storage medium storing computer executable instructions for an information processing apparatus may be provided. The information processing apparatus may comprise: a storage; a display; an operation section; a first type interface section configured to perform a wireless communication in compliance with a first communication protocol; a second type interface section configured to perform a wireless communication in compliance with a second communication protocol being different from the first communication protocol; and a processor. The computer executable instructions may cause the processor to execute storing in a first storage area of the storage, for each of a plurality of attributes, an association of the attribute and one or more default identification information for identifying one or more default devices. Each of the one or more default devices may be a device predetermined as a communication destination of the information processing apparatus. The computer executable instructions may cause the processor to execute displaying on the display, when the operation section receives an attribute designation operation for designating a specific attribute among the plurality of attributes, one or more identification information images indicating one or more default identification information being associated with the specific attribute and being stored in the first storage area. The computer executable instructions may cause the processor to execute sending via the second type interface section, when the operation section receives an image designation operation for designating a specific identification information image among the one or more identification information images displayed on the display, a command to a specific default device identified by specific default identification information corresponding to the specific identification information image designated in the image designation operation. The command may be for executing processing according to the specific attribute designated in the attribute designation operation. The computer executable instructions may cause the processor to execute communicating with a communication-target device, which is a device with which the information processing apparatus is to communicate, via the first type interface section. The computer executable instructions may cause the processor to execute storing in the first storage area to store target identification information for identifying the communication-target device as the default identification information, when a first network to which the communication-target device belongs is identical to a second network to which the information processing apparatus belongs via the second type interface section. The target identification information may be stored in association with at least one of the plurality of attributes.

DETAILED DESCRIPTION OF INVENTION

<Configuration of Network 10>

Figure 1:
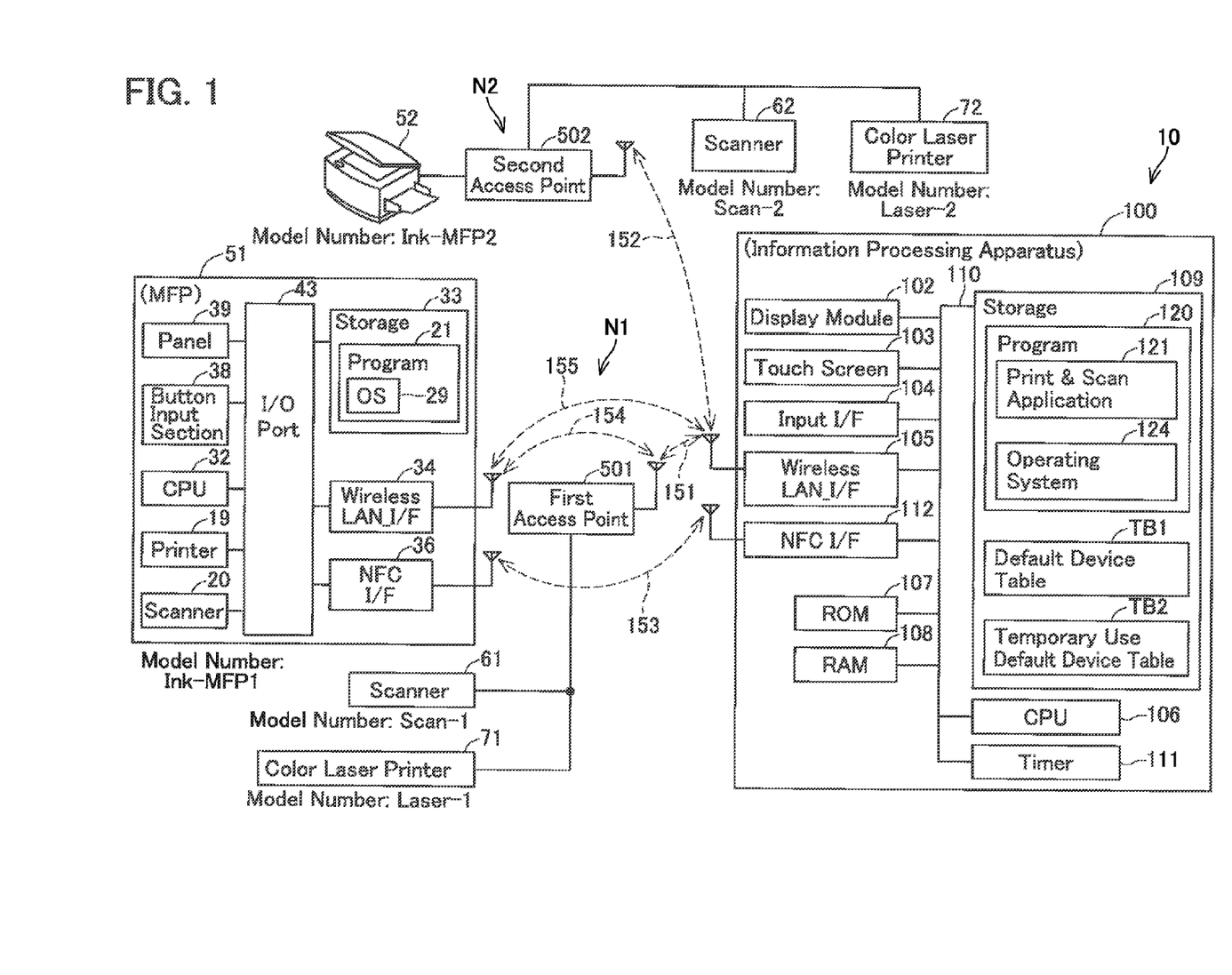
FIG. 1 is a block diagram showing a configuration of a network.

FIG. 1 is a block diagram showing a configuration of a network 10. The network 10 comprises an information processing apparatus 100, MFPs 51 and 52, a first access point 501, and a second access point 502. Here, an MFP refers to a multifunction peripheral comprising a printing function, a scan function, and a copy function.

An NFC I/F 112 of the information processing apparatus 100 can communicate with an NFC I/F 36 of the MFP 51 via a Near Field Communication (NFC) protocol wireless communication 153. In this example, a wireless communication according to the NFC protocol is executed based on ISO/IEC 21481 or 18092 Standard.

A wireless LAN_I/F 105 of the information processing apparatus 100 can conduct a wireless communication of an infrastructure mode with a wireless LAN_I/F 34 of the MFP 51 via wireless communications 151 and 154 of a wireless LAN protocol. Moreover, the wireless LAN_I/F 105 can conduct a wireless communication of an infrastructure mode with the MFP 52 via a wireless communication 152 of the wireless LAN protocol. Moreover, the wireless LAN_I/F 105 can directly communicate with the wireless LAN_I/F 34 of the MFP 51 via a wireless communication 155 of a Wi-Fi Direct®(registered trademark of Wi-Fi Alliance) (hereinafter abbreviated as WFD) protocol. Moreover, the information processing apparatus 100 can create a WFD network by establishing a connection with the MFP 51 according to the WFD protocol.

The wireless communication of the WFD protocol is sometimes established using a one-time SSID. The one-time SSID is an SSID in which a different character string is used each time the establishment of the wireless communication of the WFD protocol is attempted. The one-time SSID that is used for establishing the wireless communication of a certain WFD protocol cannot be used for the wireless communication of another WFD protocol. Moreover, with the wireless communication of the WFD protocol, there are cases where connection of the communication is sometimes disconnected when a disconnection condition (e.g.: completion of particular communication or lapse of particular time) is satisfied. This is in order to improve the security of the wireless communication of the WFD protocol. Accordingly, it could be said that the wireless communication of the WFD protocol is a communication path that may not be used in later occasions. Note that, with WFD, the wireless communication is conducted based on the 802.11 standard of The Institute of Electrical and Electronics Engineers, inc. (IEEE), and equivalent standards (for example, 802.11a, 11b, 11g, 11n or the like).

A network N1 is formed with the first access point 501, the MFP 51, a scanner 61 and a color laser printer 71. A network N2 is formed with the second access point 502, the MFP 52, a scanner 62 and a color laser printer 72. The first access point 501 and the second access point 502 each have a service set identifier (SSID). The SSID is a name for identifying the first access point 501 and the second access point 502, respectively. The information processing apparatus 100 can send a print request or a scan request to the MFPs 51 and 52, the scanners 61 and 62, and the color laser printers 71 and 72 based on communication via the wireless LAN_I/F 105 by executing a print & scan application 121.

<Configuration of Information Processing Apparatus 100>

The information processing apparatus 100 is, for example, a portable device such as a portable phone or a portable terminal device. The information processing apparatus 100 comprises a display module 102, a touch screen 103, an input I/F 104, a wireless LAN_I/F 105, an NFC I/F 112, a central processing unit (CPU) 106, a read only memory (ROM) 107, a random access memory (RAM) 108, a storage 109, and a timer 111. These elements are mutually connected via an I/O port 110.

The display module 102 receives an image signal output from the CPU 106, and displays an image based on the received image signal. As the display module 102, for example, an LCD or an organic EL display may be used. The touch screen 103 is made from a transparent member, and disposed so as to cover a surface of the display module 102. The touch screen 103 detects a position that was touched by a user's finger or the like, and outputs the detected position information to the CPU 106. The input I/F 104 is, for example, an operation button. The timer 111 is a portion that measures a lapse of a predetermined set time.

The NFC I/F 112 is an interface for executing the wireless communication 153 of the NFC protocol. In order to establish the wireless communication 153 of the NFC protocol, various types of information (e.g.: IP address, SSID, and the like) for communication setting are not required. The wireless LAN_I/F 105 is an interface for executing the wireless communications 151, 152, 155 of the wireless LAN protocol. A communicable distance of the wireless communications 151, 152, 155 of the wireless LAN protocol is longer than a communicable distance of the wireless communication 153 of the NFC protocol. Moreover, a communication speed of the wireless communications 151, 152, 155 of the wireless LAN protocol is faster than a communication speed of the wireless communication 153 of the NFC protocol. Moreover, frequency bands that are used are different in the NFC protocol and the wireless LAN protocol.

The CPU 106 executes programs stored in the storage 109. The RAM 108 temporarily stores information required for processing to be performed by the CPU 106. The storage 109 is configured by combining a flash memory, a hard disk (HDD), a buffer of the CPU 106, and so on. The storage 109 can store image data, document data, and the like. The storage 109 stores a program 120. The program 120 includes the print & scan application 121 (hereinafter indicated as the application 121), and an operating system 124 (hereinafter referred to as the OS 124). The CPU 106 executes processing according to the program 120. In the ensuing explanation, the CPU 106 to execute programs such as the application 121 and the OS 124 is sometimes simply referred to by the program name. For example, the description of "the application 121" may sometimes mean "the CPU 106 that executes the application 121".

The application 121 is an application for causing the CPU 106 to execute processing such as sending a printing command from the information processing apparatus 100 to the MFP 51 or the like. The OS 124 is a program that provides basic functions and is commonly used by the application 121 and the like. The OS 124 includes programs and the like for conducting a wireless communication with the wireless LAN_I/F 105 and the NFC I/F 112. Moreover, the OS 124 is a program for the respective programs to acquire information that was acquired by the various types of hardware or for providing an application programming interface (API) for the respective programs to give commands to the various types of hardware.

Moreover, the storage 109 stores a default device table TB1, and a temporary use default device table TB2. The default device table TB1 is a table for storing default device identification information 600 for identifying a default device, and a default network SSID for identifying a default network. The default device is a device that is set forth each use. The default device is a device that is preferentially used among a plurality of devices when such a plurality of devices capable of executing processing pertaining to a certain use exists. The default network is a network that is set as a communication destination of a communication using the wireless LAN_I/F 105 of the information processing apparatus 100. The network which includes the default device may also be set as the default network.

Figure 6:
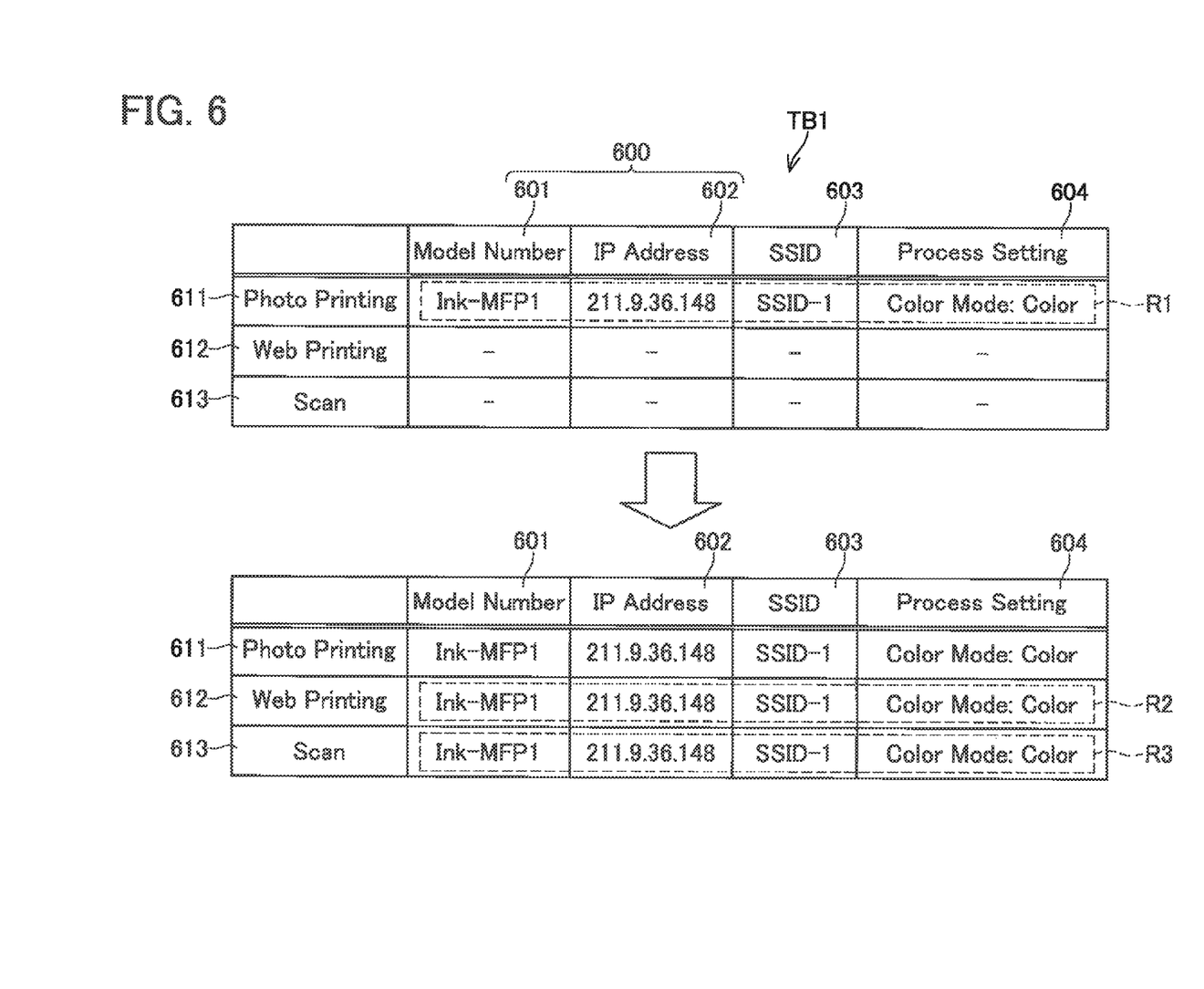
FIG. 6 is a diagram showing an example of a default device table TB1.

FIG. 6 shows an example of the default device table TB1. The default device table TB1 comprises a storage area for each of the three types of uses of photo printing 611, web printing 612, and scan 613. The storage area for the use in the photo printing 611 stores information for identifying the default device that is set for photo printing. With photo printing, the information processing apparatus 100 sends a print request of image data such as JPEG, Bitmap or GIF to a device having a printing function, and processing for causing the device to execute printing is performed. The storage area for use in the web printing 612 stores information for identifying the default device that is set for web printing. With web printing, the information processing apparatus 100 sends a print request of a web page to a device having a printing function, and processing for causing the device to execute printing is performed. The storage area for use in the scan 613 stores information for identifying the default device that is set for scanning. With scan, the information processing apparatus 100 sends a scan request to a device having a scan function, and processing for causing the device to execute a scan is performed.

The default device table TB1 stores, as information related to the device, default device identification information 600, a default network SSID 603, and a process setting 604. The default device identification information 600 is information for identifying the default device, and comprises a model number 601 and an IP address 602. The model number 601 is information for identifying the type of the respective devices. In the first embodiment, the device model number 601 of the MFP 51 is "Ink-MFP1". Moreover, the device model number 601 of the scanner 61 is "Scan-1". Moreover, the device model number 601 of the color laser printer 71 is "Laser-1". The IP address 602 is an identification number that is assigned to the respective devices and used for communication. The default network SSID 603 is an access point name for identifying the access point configuring the default network. The process setting 604 is information indicating the various settings upon executed the respective uses. As examples of the process setting 604, considered may be a color mode, image processing size (e.g.: A4 size, L size), or the like.

In the example of the default device table TB1 shown in FIG. 6, when device capable of executing processing related to the use of the photo printing 611 exists in a plurality with regard to that use (MFPs 51 and 52, color laser printers 71 and 72), it can be seen that the MFP 51 is set as the device that is preferentially used among the plurality of devices.

Figure 7:
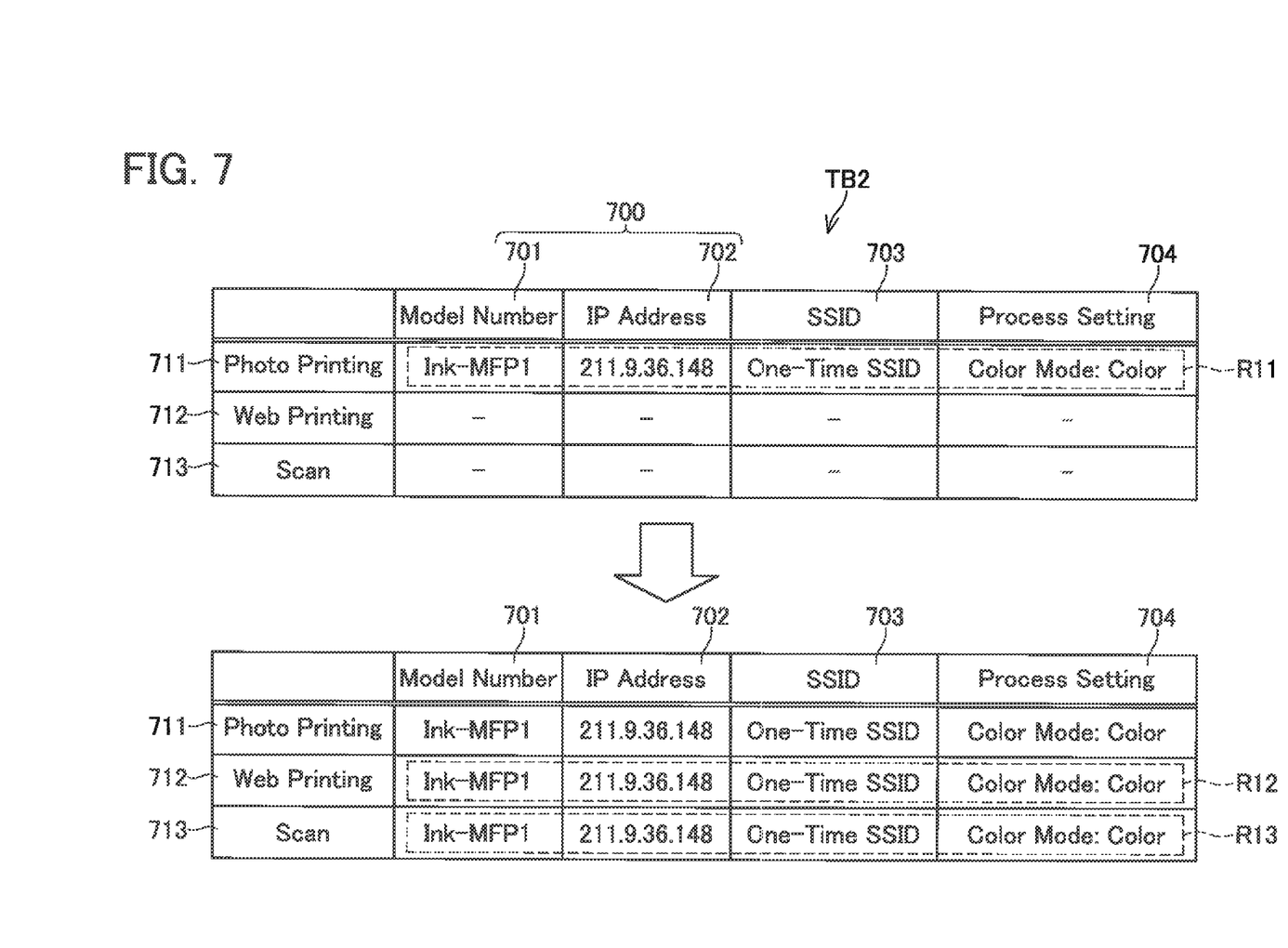
FIG. 7 is a diagram showing an example of a temporary use default device table TB2.

The temporary use default device table TB2 of FIG. 7 is a table for storing temporary use default device identification information for identifying a temporary use default device, and a temporary use default network SSID for identifying a temporary use default network. The temporary use default device is one device that is set for each use upon executing the various types of processing by using a temporary communication path. As an example of a temporary communication path, considered may be a communication path of the WFD protocol that is established by using a one-time SSID. Note that, since the stored contents of the temporary use default device table TB2 are the same as the default device table TB1, the explanation thereof is omitted.

<Configuration of MFP 51>

The configuration of the MFP 51 is now explained. The MFP 51 mainly comprises a CPU 32, a storage 33, a wireless LAN_I/F 34, an NFC I/F 36, a button input section 38, a panel 39, a printer 19, and a scanner 20. These constituent elements are mutually communicable via an I/O port 43.

The CPU 32 executes a program 21 stored in the storage 33. The storage 33 is configured by combining RAM, ROM, flash memory, a hard disk (HDD), a buffer of the CPU 32, and so on. The storage 33 stores the program 21. The program 21 includes an OS 29 and the like.

The NFC I/F 36 is an interface for executing the wireless communication 153 of the NFC protocol. The wireless LAN_I/F 34 is an interface for executing the wireless communications 154, 155 of the wireless LAN protocol. The button input section 38 is a key for executing the respective functions of the MFP 51. The button input section 38 may also be configured integrally, as a touch screen, with the panel 39. The panel 39 displays the various types of functional information of the MFP 51. The printer 19 is a portion for executing printing using the image data stored in the storage 33. The scanner 20 is a portion for executing reading. Note that, while the MFP 52 is configured similarly as the MFP 51, the illustration thereof is FIG. 1 is omitted for the simplification of the drawings.

<Operation of Application 121>

Figure 2:
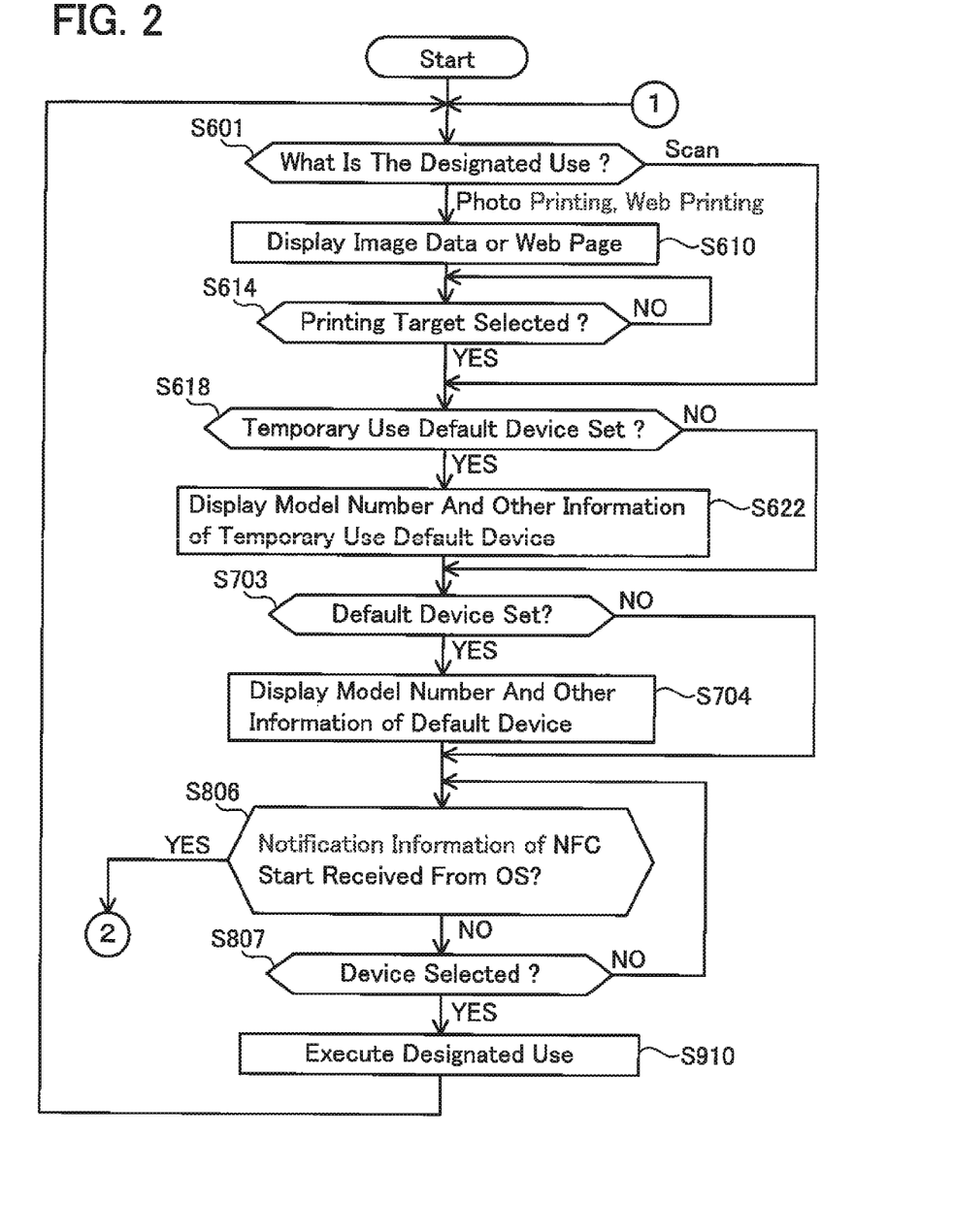
FIG. 2 is a flowchart explaining a first part of processing for a CPU to control respective parts according to an application.

Processing to be performed by the CPU 106 for controlling the respective sections according to the application 121 is now explained with reference to FIGS. 2 to 5. When the application 121 is activated, a flow of FIG. 2 is started. In S601, the application 121 receives a use designation operation for designating a use among the three types of uses of "photo printing", "web printing", and "scan". For example, the application 121 displays, on a display module 102, an icon corresponding to each of the three types of uses described above in the display module 102. In addition, upon receiving an operation to touch the portion displaying the icon, it is determined that the use indicated by the touched icon has been designated. When "scan" is designated as the designated use, the flow proceeds to S618. Meanwhile, when "photo printing" or "web printing" is designated as the designated use, the flow proceeds to S610.

In S610, when "photo printing" is the designated use, the application 121 displays, on the display module 102, a list of thumbnails of image data stored in the storage 109. Moreover, in S610, when "web printing" is the designated use, the application 121 displays, on the display module 102, the web page designated by the user. Subsequently, an icon for setting the displayed web page as the printing target is displayed on the display module 102. Explanation of the display method of the web page and the like is omitted since it is not essential to the present invention.

In S614, the application 121 determines whether the printing target was selected. Specifically, the application 121 determines whether the portion displaying the thumbnail or the icon in the display module 102 has been touched by the user. If the portion was touched, the application 121 determines that a command for setting the image data of the thumbnail displayed at the touched portion as the printing target, or a command for setting the displayed web page as the printing target was received (S614: YES), and proceeds to S618. Meanwhile, when it is determined that a printing target was not selected (S614: NO), the application 121 returns to S614 and repeats the determination.

In S618, the application 121 determines whether a temporary use default device is set for the designated use that was designated in S601. Specifically, the application 121 refers to the storage area corresponding to the designated use in the temporary use default device table TB2 (refer to example of FIG. 7). Subsequently, the application 121 determines whether the model number 701 and the IP address 702 are stored. When it is determined that a temporary use default device is not set (S618: NO), the flow proceeds to S703, and when it is determined that a temporary use default device is set (S618: YES), the flow proceeds to S622. In S622, the application 121 displays, on the display module 102, information (e.g.: model number 701) for identifying the device that is set as the temporary use default device, and an icon for receiving an execution instruction for the designated use.

Figure 3:
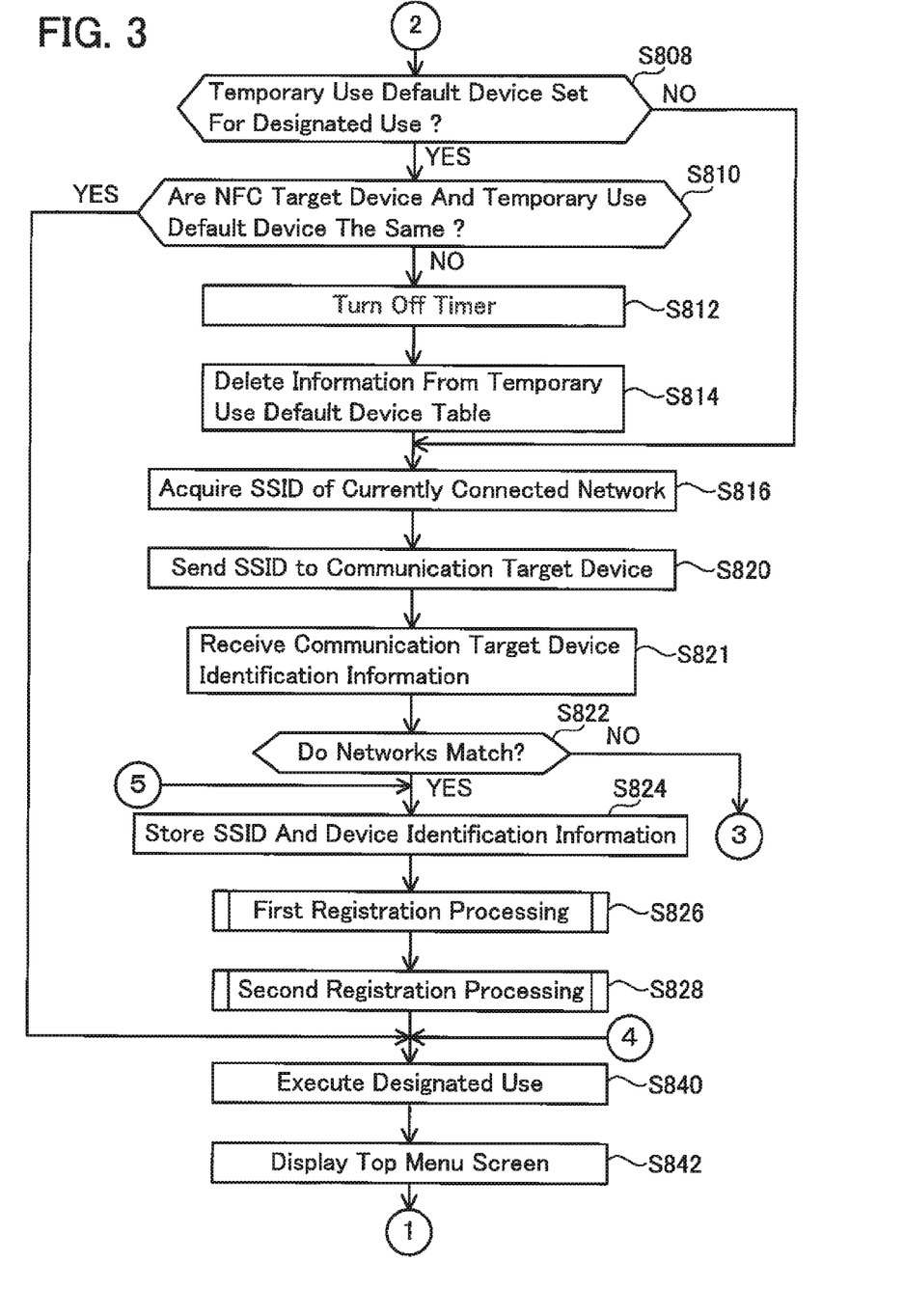
FIG. 3 is a flowchart explaining the second part of the processing for the CPU to control the respective parts according to an application.

In S703, the application 121 determines whether a default device is set for the designated use that was designated in S601 (S703). Specifically, the application 121 refers to the storage area corresponding to the designated use in the default device table TB1 (refer to the example of FIG. 6). Subsequently, the application 121 determines whether the model number 601 and the IP address 602 are stored. When it is determined that a default device is not set (S703: NO), the flow proceeds to S806, and when it is determined that a default device is set (S703: YES), the flow proceeds to S704. In S704, the application 121 displays, on the display module 102, information (e.g.: model number 601) for identifying the device that is set as the default device, and an icon for receiving an execution instruction for the designated use.

In S806, the application 121 determines whether notification information for starting the NFC was received from the OS 124. The NFC is started by the information processing apparatus 100 approaching within a particular distance centered around the NFC I/F. The particular distance may be, for example, roughly 10 cm. When the notification information was not received from the OS 124 (S806: NO), the flow proceeds to S807.

In S807, the application 121 determines whether an operation for selecting the displayed model number or the like (device designation operation) was received by the touch screen 103. When the device designation operation was not received (S807: NO), the flow returns to S806, and when the device designation operation was received (S807: YES), the flow proceeds to S910.

Figure 4:
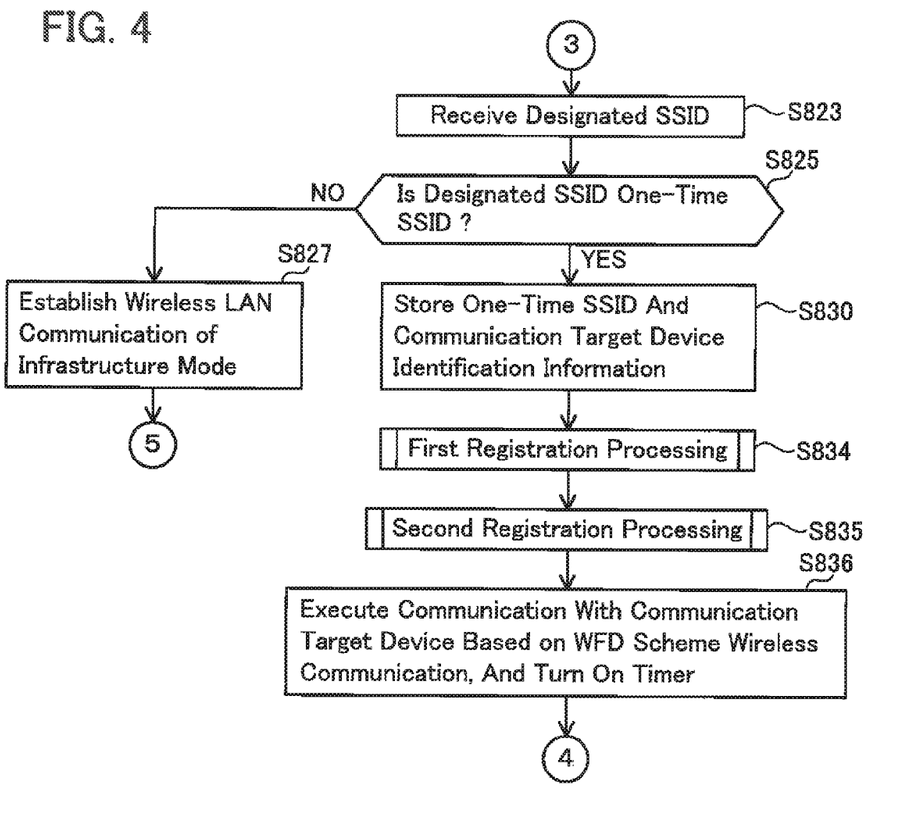
FIG. 4 is a flowchart explaining the third part of the processing for the CPU to control the respective parts according to an application.

In S910, the application 121 executes the designated use. For example, when the designated use is "photo printing", the print request of image data that was selected in S702 is sent to the default device or the temporary use default device based on communication via the wireless LAN_I/F 105 by using the IP address and the like read from the default device table TB1 or the temporary use default device table TB2. Moreover, when the designated use is "web printing", the print request of the web page, which was designated as the printing target in S702, is sent to the default device or the temporary use default device based on a communication using the wireless LAN_I/F 105. Moreover, when the designated use is "scan", the scan request is sent to the default device or the temporary use default device. Subsequently, scan data that was returned from the default device or the temporary use default device is received by the wireless LAN_I/F 105. The flow then returns to S601.

Meanwhile, in S806, when notification information for starting the NFC is received from the OS 124 (S806: YES), the flow proceeds to S808. In S808, the application 121 determines whether a temporary use default device is set for the designated use that was designated in S601. Since the determination method is similar to the method performed in S618 described above, the explanation thereof is omitted. When a temporary use default device is not set (S808: NO), the flow proceeds to S816, and when a temporary use default device is set (S808: YES), the flow proceeds to S810.

In S810, the application 121 determines whether the device for starting the NFC and the temporary use default device that is set for the designated use are the same device. This determination may also be performed by determining, for example, whether the model number and the IP address are a match in both devices. When both devices are a match (S810: YES), the flow proceeds to S840, and when both devices are not a match (S810: NO), the flow proceeds to S812. In S812, the application 121 turns OFF the timer 111. Moreover, in S814, the application 121 deletes all information stored in the temporary use default device table TB2, and then proceeds to S816.

In S816, the application 121 acquires, from the OS 124, the SSID of the currently connected network of the information processing apparatus 100. In S820, the application 121 uses the wireless communication 153 of the NFC protocol and sends the acquired SSID to the communication-target device.

In S821, the application 121 uses the wireless communication 153 of the NFC protocol and receives communication-target device identification information from the communication-target device. The communication-target device identification information is information for identifying the communication-target device. As examples of the communication-target device identification information, considered may be the model number of the communication-target device, the IP address of the communication-target device, the SSID of the network including the communication-target device, the password of the SSID, and the like. Moreover, the application 121 may also receive matching information described later from the communication-target device.

In S822, the application 121 determines whether the network including the communication-target device and the currently connected network of the information processing apparatus 100 are a match. This determination may also be performed, for example, based on matching information received from the communication-target device in S821. The matching information is information indicating whether the network including the communication-target device and the currently connected network of the information processing apparatus 100 are a match. The matching information is generated by the communication-target device. For example, the communication-target device may also generate the matching information indicating that the two networks are a match when the SSID (this SSID is sent to the communication-target device in S820) of the currently connected network of the information processing apparatus 100 and the SSID (this SSID is stored, for example, in the storage of the communication-target device) of the network to which the communication-target device belongs are a match.

When the two networks are a match (S822: YES), it is determined that the information processing apparatus 100 can conduct communication with the communication-target device via the currently connected network of the information processing apparatus 100. Thus, since it is not necessary to perform processing for newly establishing a communication path, the flow proceeds to S824.

In S824, the application 121 stores, in a designated use column of the default device table TB1, the SSID of the network including the communication-target device and the device identification information for identifying the communication-target device.

In S826, performed is first registration processing of storing the default device upon associating that default device with a first non-designated use. Moreover, in S828, performed is second registration processing of storing the default device upon associating that default device with a second non-designated use.

Here, the default device that is registered is the communication-target device (that is, the device that was placed over the information processing apparatus 100) that was selected as the communication target in S806. For example, when the designated use selected in S601 is "photo printing", a default device is stored by being associated with "web printing" (first non-designated use) in the first registration processing, and a default device is stored by being associated with "scan" (second non-designated use) in the second registration processing. Moreover, when the designated use selected in S601 is "web printing", a default device is stored by being associated with "scan" (first non-designated use) in the first registration processing, and a default device is stored by being associated with "photo printing" (second non-designated use) in the second registration processing. Moreover, when the designated use selected in S601 is "scan", a default device is stored by being associated with "photo printing" (first non-designated use) in the first registration processing, and a default device is stored by being associated with "web printing" (second non-designated use) in the second registration processing.

As an example, explained is the processing of storing a default device by associating that default device with the non-designated use of "web printing". This processing is performed in the first registration processing (S826) or the second registration processing (S828). The application 121 determines whether the model number 601 and the like have previously been stored in the storage area of the web printing 612 of the default device table TB1. The processing is ended when the model number 601 and the like have previously been stored. When the model number 601 and the like have not yet been stored, the default device identification information 600, the default network SSID 603, and the process setting 604 are stored in the storage area of the web printing 612 of the default device table TB1.

Note that, since the processing contents of storing a default device by associating that default device with the non-designated use of "scan" or "photo printing" are the same as the processing contents of storing a default device by associating that default device with the non-designated use of "web printing" described above, the explanation thereof is omitted.

Upon proceeding to S840, the application 121 uses the wireless LAN_I/F 105 to communicate various types of data with the communication-target device for executing the designated use. Since the communication using the wireless LAN_I/F 105 is faster than the communication using the NFC I/F 112, various types of data can be communicated in a shorter time. When the execution of the designated use is complete, the flow proceeds to S842, the application 121 displays a top menu screen on the display module 102, and then the flow returns to S601.

Meanwhile, in S822, when it is determined that the network including the communication-target device and the currently connected network of the information processing apparatus 100 are not a match (S822: NO), the flow proceeds to S823. In S823, the application 121 receives the designated SSID from the communication-target device via the wireless communication 153 of the NFC protocol. The designated SSID is the SSID that was designated by the communication-target device. Moreover, the designated SSID is the SSID that is used upon communicating with the communication-target device via the wireless LAN_I/F 105.

In S825, the application 121 determines whether the designated SSID received from the communication-target device is a one-time SSID. The one-time SSID is an SSID having a different character string each time it is issued. Moreover, the one-time SSID is an SSID for performing wireless communication of the WFD protocol described above. As one example of a method of distinguishing whether the designated SSID is a one-time SSID, there is the method of determining whether a particular character string indicating a one-time SSID is included in the character string of the designated SSID. Moreover, as an example of a particular character string, considered may be a character string such as "one time" contained in a node name.

When the designated SSID is not a one-time SSID (S825: NO), it is possible to determine that the wireless LAN communication of the infrastructure mode via an access point has been designated by the communication-target device. Thus, the flow proceeds to S827, the application 121 establishes the wireless LAN communication of the infrastructure mode, and then the flow proceeds to S824. Meanwhile, in S825, when it is determined that the designated SSID is a one-time SSID (S825: YES), it is determined that the wireless communication of the WFD protocol has been designated by the communication-target device, and the flow proceeds to S830.

In S830, the application 121 stores the one-time SSID and the device identification information for identifying the communication-target device in the designated use column of the temporary use default device table TB2.

In S834, performed is the first registration processing of storing the temporary use default device by associating it with the first non-designated use. Moreover, in S835, performed is the second registration processing of storing the temporary use default device by associating it with the second non-designated use. Note that, since the processing contents performed in S834 and S835 are similar to the processing contents performed in S826 and S828 described above, the explanation thereof is omitted.

In S836, the application 121 communicates with the communication-target device based on the wireless communication of the WFD protocol. Specifically, the application 121 communicates with the communication-target device based on the wireless communication of the WFD protocol via the wireless LAN_I/F 105 by providing the one-time SSID received in S823 to the OS 124. Moreover, the application 121 starts measuring the set time by turning ON the timer 111, and then proceeds to S840.

Figure 5:
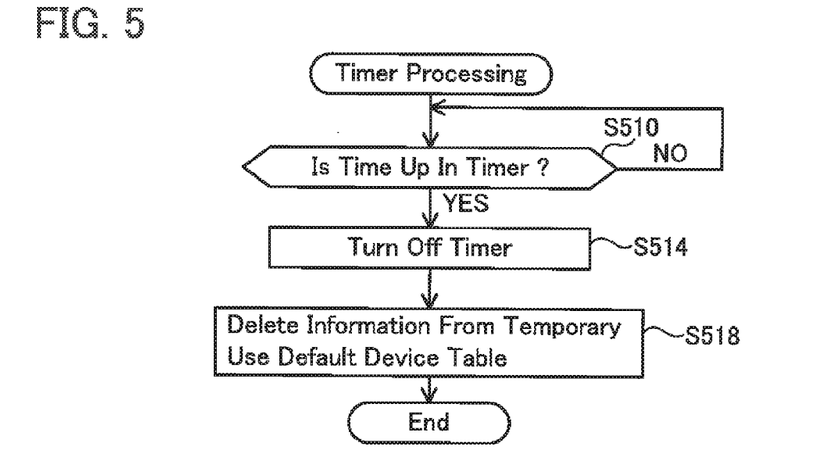
FIG. 5 is a flowchart explaining timer processing.

Timer processing is now explained with reference to FIG. 5. The flow of FIG. 5 is the flow that is started by the timer 111 being turned ON in S836. In S510, the application 121 determines whether the time is up in the timer 111 (that is, whether a predetermined set time has elapsed). When the time is not up (S510: NO), the flow returns to S510, and when the time is up (S510: YES), the flow proceeds to S514.

In S514, the application 121 turns OFF the timer 111. In S518, the application 121 deletes all information stored in the temporary use default device table TB2, and then ends the flow.

First Operational Example

In a first operational example, explained is a case where the information processing apparatus 100 is in a state of being connected to the first access point 501 included in the network N1 based on the wireless communication 151. Moreover, in the below case, the user places the information processing apparatus 100 over the MFP 51 (that is, selects the MFP 51 as the communication-target device). Moreover, in the below case, the user executes "photo printing" the first time, and executes "scan" the second time. Moreover, in the below case, no information is stored in the default device table TB1.

As a result of the user designating "photo printing" as the designated use (S601: photo printing), the printing target is selected (S614: Y). Since a temporary use default device is not set (S618: N) and a default device is not set (S703: N), information for identifying the default device is not displayed on the display module 102. When the user places the information processing apparatus 100 over the MFP 51 (S806: Y), the SSID (that is, SSID-1 of the first access point 501) of the currently connected network N1 of the information processing apparatus 100 is acquired from the OS 124 (S816). Moreover, the acquired SSID is sent to the MFP 51 as the communication-target device (S820). The application 121 uses the wireless communication 153 of the NFC protocol and receives, from the MFP 51, the communication-target device identification information for identifying the MFP 51 (S821).

Since the network including the MFP 51 as the communication-target device and the currently connected network of the information processing apparatus 100 are both the network N1 and are a match (S822: Y), the default device identification information 600 of the MFP 51, the SSID of the network N1, and the process setting 604 are stored in the column of the photo printing 611 of the default device table TB1 (S824) (FIG. 6, region R1). The default device identification information 600, the SSID of the network N1, and the process setting 604 are stored in the default device table TB1 by being associated with "web printing" as the first non-designated use (S826) (FIG. 6, region R2). The default device identification information 600, the SSID of the network N1, and the process setting 604 are stored in the default device table TB1 by being associated with "scan" as the second non-designated use (S828) (FIG. 6, region R3). Data for executing "photo printing" is sent to the MFP 51 via the wireless communications 151 and 154 (S840). When the processing of "photo printing" is complete, the top menu screen is displayed on the display module 102 (S842).

Figure 8:
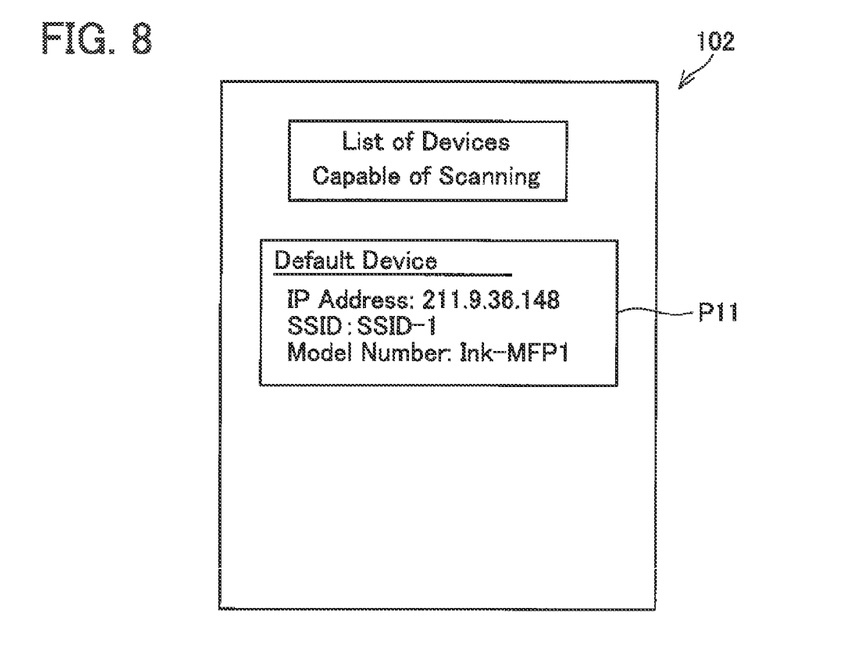
FIG. 8 is a diagram showing a display example of a display module.

When the user designates "scan" as the second processing (S601: scan), since the default device has been set (S703: Y), the model number of the MFP 51 as the default device corresponding to the designated use of "scan" and other information are displayed on the display module 102 (S704) (FIG. 8, image P11). When the user touches the image P11 (S807: Y), the scan request is sent to the MFP 51 as the default device via the wireless communications 151 and 154 (S910). The flow then returns to S601.

Second Operational Example

In a second operational example, explained is a case where the information processing apparatus 100 is in a state of being connected to the second access point 502 included in the network N2 based on the wireless communication 152. Moreover, in the below case, the user places the information processing apparatus 100 over the MFP 51 (that is, selects the MFP 51 as the communication-target device). Moreover, in the below case, the user executes "photo printing" the first time, and executes "scan" the second time. Moreover, in the below case, the MFP 52 is registered as the default device for the uses of the photo printing 611 and the scan 613 of the default device table TB1. Moreover, in the below case, the one-time SSID is received as the designated SSID.

Figure 9:
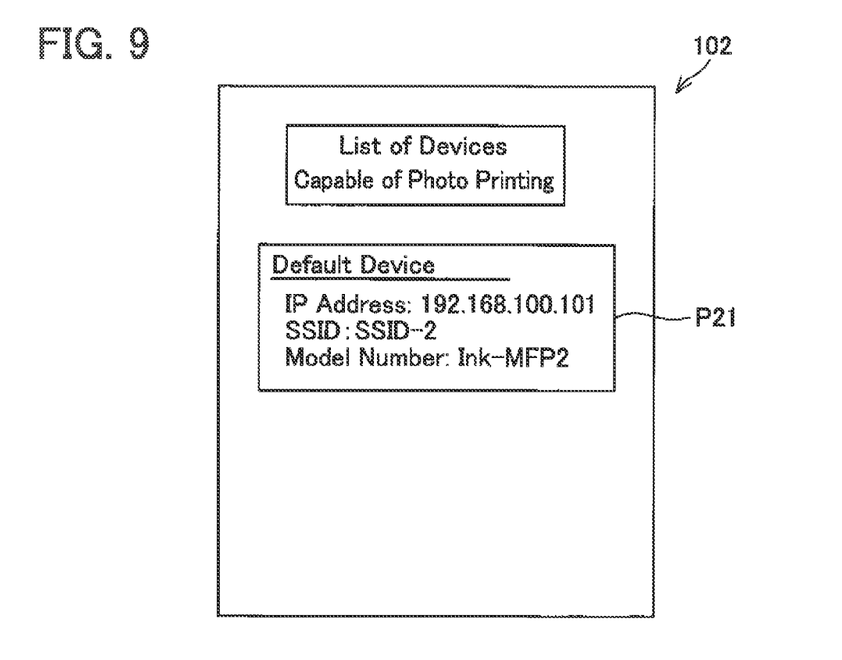
FIG. 9 is a diagram showing a display example of a display module.

As a result of the user designating "photo printing" as the designated use (S601: photo printing), the printing target is selected (S614: Y). Since the MFP 52 is set as the default device for "photo printing" (S703: Y), the model number of the MFP 52 corresponding to the designated use of "photo printing" and other information are displayed on the display module 102 (S704) (FIG. 9, image P21). When the user places the information processing apparatus 100 over the MFP 51 (S806: Y), the SSID (that is, SSID-2 of the second access point 502) of the currently connected network N2 of the information processing apparatus 100 is acquired from the OS 124 (S816). Moreover, the acquired SSID is sent to the MFP 51 as the communication-target device (S820). The application 121 uses the wireless communication 153 of the NFC protocol and receives, from the MFP 51, the communication-target device identification information for identifying the MFP 51 (S821).

Since the network (that is, network N1) including the MFP 51 as the communication-target device and the currently connected network (that is, network N2) of the information processing apparatus 100 are different networks (S822: N), the designated SSID is received from the MFP 51 via the wireless communication 153 of the NFC protocol (S823). Since the received designated SSID is a one-time SSID (S825: Y), the identification information of the MFP 51, the one-time SSID, and the process setting are stored in the column of the photo printing 611 of the temporary use default device table TB2 (S830) (FIG. 7, region R11). The identification information of the MFP 51, the one-time SSID, and the process setting are stored in the temporary use default device table TB2 by being associated with "web printing" as the first non-designated use (S834) (FIG. 7, region R12). The identification information of the MFP 51, the one-time SSID, and the process setting are stored in the temporary use default device table TB2 by being associated with "scan" as the second non-designated use (S835) (FIG. 7, region R13).

The communication of the information processing apparatus 100 and the MFP 51 is established based on the wireless communication 155 of the WFD protocol (S836). Moreover, the timer 111 is turned ON (S836). Data for performing "photo printing" is sent to the MFP 51 via the wireless communication 155 (S840). When the processing of "photo printing" is complete, the top menu screen is displayed on the display module 102 (S842).

Figure 10:
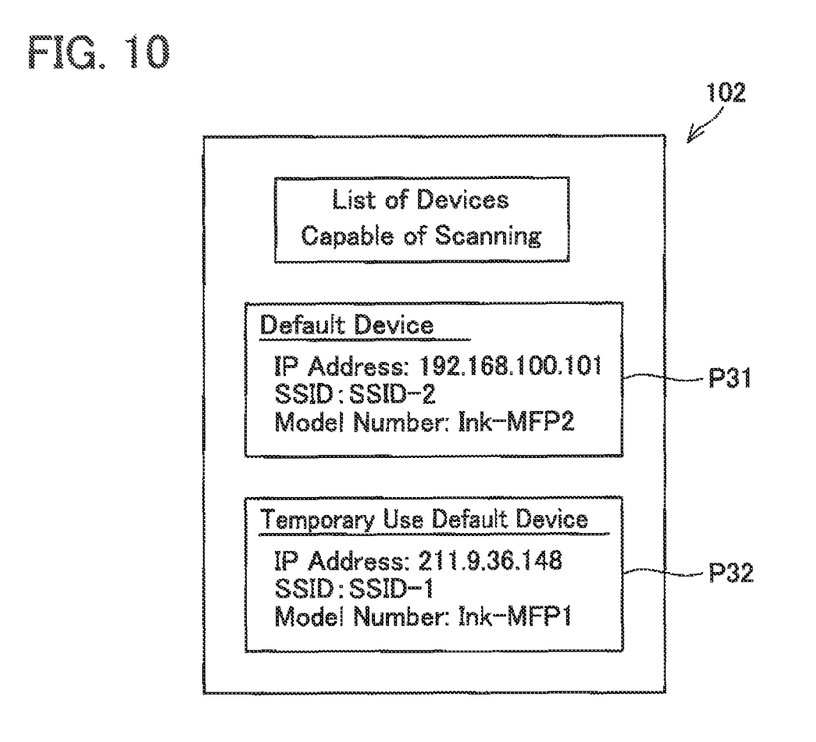
FIG. 10 is a diagram showing a display example of a display module.

When the user designates "scan" as the second processing (S601: scan), since both the temporary use default device (that is, MFP 51) and the default device (that is, MFP 52) are set (S618: Y, S703: Y), the model number of the temporary use default device and the model number of the default device and other information are displayed on the display module 102 corresponding to the designated use of "scan" (S704) (FIG. 10, images P31 and P32). When the user touches the image P31 (S807: Y), the scan request is sent to the MFP 52 as the default device via the wireless communication 152 (S910). Moreover, when the user touches the image P32 (S807: Y), the scan request is sent to the MFP 51 as the temporary default device via the wireless communication 155 (S910). Moreover, when the set time elapses from the time that the timer 111 is turned ON (S510: Y), all information stored in the temporary use default device table TB2 is deleted (S518). Thus, in FIG. 10, the image P32 is not displayed.

<Effects>

Effects of the application 121 described above are now explained. With the application 121, it is possible to determine that communicating with the communication-target device by using the connected network when the network including the communication-target device (that is, the device touched the information processing apparatus 100) and the network to which the information processing apparatus 100 is connected via the wireless LAN_I/F 105 are the same networks (S822: Y). To put it differently, since it is not necessarily to newly establish a wireless communication, it is possible to determine that the wireless communication (e.g.: wireless communication 155 of the WFD protocol), which may become unavailable subsequently, may not be used. Thus, information for identifying the communication-target device can be stored in the default device table TB1 by being associated with uses other than the designated use designated in S601 as information for identifying the default device (S826, S828). Consequently, it is possible to improve the user's convenience since there is no need to perform operations such as registering the default device for each type of use (e.g.: photo printing, web printing, scan).

Moreover, even in cases where the wireless communication (e.g.: wireless communication 155 of the WFD protocol) that may become unavailable subsequently is used (S836), the identification information of the communication-target device (that is, the device that touched the information processing apparatus 100) can be stored in the temporary use default device table TB2 by being associated with uses other than the designated use that was designated in S601 (S834, S835). Moreover, in accordance with the elapse of the set time from the start of the wireless communication which may become unavailable subsequently (S510: Y), all information stored in the temporary use default device table TB2 may be deleted (S518). Consequently, it is possible to eliminate the need to perform operations such as registering the temporary use default device for each type of use (e.g.: photo printing, web printing, scan). In addition, by merely selecting the model number of the temporary use default device until the elapse of the set time (S807: Y), various types of processing can be performed (S910). Moreover, by performing control so that the temporary use default device table TB2 can be used only until the set time elapses, it is possible to prevent a situation where the communication path that may become unavailable subsequently is continuously used by the user.

With the application 121, it is possible to determine whether the network including the communication-target device and the currently connected network of the information processing apparatus 100 are a match based on the matching information received from the communication-target device (S822). Consequently, since the matching of the two networks can be performed by the communication-target device, the processing load of the information processing apparatus 100 can be reduced.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

Modified Examples

While this embodiment explained a case where, when it is determined that the network including the communication-target device and the currently connected network of the information processing apparatus 100 are not a match (S822: NO), information for identifying the communication-target device is stored in the temporary use default device table TB2, the configuration is not limited thereto. When the two networks are not a match, it is also possible to not store any information in any of the tables. In the foregoing case, in S622, the temporary use default device is not displayed on the display module 102. Moreover, in the foregoing case, it is possible to omit S830, S834, S835, S618, S622, and the like.

The condition for deleting all information stored in the temporary use default device table TB2 is not limited to the lapse of the set time (S510: Y), and various conditions may be used. For example, the information stored in the temporary use default device table TB2 may also be deleted when the wireless communication 155 of the WFD protocol established in S836 is disconnected. Consequently, the temporary use default device can be designated as the device for executing the designated use while the connection to the communication-target device using the wireless communication 155 of the WFD is being established (S807).

While this embodiment explained a mode of displaying both the model number of the temporary use default device and the model number of the default device (S622 and S704), the configuration is not limited thereto. Even when the default device is set while the temporary use default device is being set (S618), it is possible to display only the model number of the temporary use default device. During the period that only the model of the temporary use default device is being displayed, there is no need for the user to designate the device for executing the designated use. Thus, it is also possible to adopt a mode of automatically selecting the temporary use default device as the device for executing the designated use. Otherwise, it is also possible to adopt the temporary use default device as the device for executing the designated use according to whether the operation for selecting the model number of the temporary use default device is received. Subsequently, when the setting of the temporary use default device is cancelled (S518), the model number of the default device may be displayed (S704). Consequently, when both the temporary use default device and the default device are set, it is possible to cause the temporary use default device to preferentially execute the processing. In order to perform this kind of control, after the step of S622 in the flow of FIG. 2, the flow should proceed to S806.

The matching of the network including the communication-target device and a specific network is not limited to the mode of being executed with the communication-target device. The matching may also be executed by the application 121. In the foregoing case, in S816, the application 121 may receive, from the communication-target device, the SSID for identifying the network included in the communication-target device. Moreover, in 822, the application 121 may determine whether the SSID (this SSID is read, for example, from the storage 109) of the currently connected network of the information processing apparatus 100 and the SSID (this SSID is acquired in S816) of the network to which the communication-target device belongs are a match. Consequently, the matching can be executed by the application 121.

Registration of the default device in the default device table TB1 is not limited to the mode performed in S826, S828. For example, the default device can also be registered by the user operating the touch screen 103 or the like and inputting an IP address or the like.

The timing of the application 121 acquiring the SSID of the currently connected network of the information processing apparatus 100 from the OS 124 is not limited to the timing of S816. For example, the SSID may also be acquired at the timing of displaying a printing preview or the timing of activating the application 121.

The processing of S822 and S825 can be omitted. In the foregoing case, the designated SSID is constantly treated as a one-time SSID. Thus, communication with the communication-target device is constantly based on the wireless communication of the WFD protocol.

This embodiment explained a mode of selecting, as the communication-target device, the device that executed the NFC by the user holding the information processing apparatus 100 over that device, and causing that communication-target device to execute the printing processing. When executing the printing processing using the NFC as described above, information for causing the user to recognize that it is printing processing using the NFC may be displayed on the display module 102. For example, a character string indicating that the device over which the information processing apparatus 100 was placed is executing the printing may be displayed on the display module 102.

The value of the IP address and the character string of the SSID used in this embodiment are merely examples, and various values and character strings may be used.

While this embodiment described a mode of the wireless LAN_I/F 105 of the information processing apparatus 100 conducting the wireless communication of the infrastructure mode with the MFPs 51 and 52, the configuration is not limited thereto. The wireless LAN_I/F 105 may also perform the wireless communication of an ad hoc mode with the MFPs 51 and 52 without going through the first access point 501 or the second access point 502.

Communication between the first access point 501 and the MFP 51, the scanner 61, and the color laser printer 71 and communication between the second access point 502 and the MFP 52, the scanner 62, and the color laser printer 72 may be a wireless or wired communication.

The display example of the display module 102 of FIG. 8 to FIG. 10 is merely an example. The display module 102 may also display images of various display modes.

The model numbers 601 and 701 may be anything so as long as they are able to differentiate the devices; for instance, they may be configured only from symbols without including numbers. Moreover, a name such as the device name capable of differentiating the devices may be used in substitute for the model number.

Information for identifying the device is not limited to the IP addresses 602 and 702, and may also be configured from an URL or a MAC address.

The information processing apparatus 100 may also be configured so that an external memory such as a memory card can be connected thereto. Furthermore, in substitute for the storage 109, a configuration of storing the various types of data in an external memory can be adopted.

For example, the print & scan application 121 may be stored in a non-transitory computer-readable storage medium included in a server not shown. A hard disk drive included in the server is an example of the non-transitory computer-readable storage medium. The information processing apparatus 100 may acquire the print & scan application 121 from the server via the wireless LAN_I/F 105 and install the acquired print & scan application 121 in the storage 109.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the touch screen 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

The invention claimed is:

1. A non-transitory computer-readable storage medium storing computer executable instructions for an information processing apparatus,
   the information processing apparatus comprising:
   a storage;
   a display;
   an operation section;
   a first type interface section configured to perform wireless communication in compliance with a first communication protocol;
   a second type interface section configured to perform wireless communication in compliance with a second communication protocol different from the first communication protocol; and
   a processor,
   the computer executable instructions causing the processor to execute:
   storing in a first storage area of the storage, for each of a plurality of attributes, an association of the attribute and one or more default identification information for identifying one or more default devices, each of the one or more default devices being a device predetermined as a communication destination of the information processing apparatus;
   displaying on the display, when the operation section receives an attribute designation operation for designating a specific attribute among the plurality of attributes, one or more identification information images indicating one or more default identification information being associated with the specific attribute and being stored in the first storage area;
   sending via the second type interface section, when the operation section receives an image designation operation for designating a specific identification information image among the one or more identification information images displayed on the display, a command to a specific default device identified by specific default identification information corresponding to the specific identification information image designated in the image designation operation, the command being for executing processing according to the specific attribute designated in the attribute designation operation;
   communicating with a communication-target device, which is a device with which the information processing apparatus is to communicate, via the first type interface section;
   storing, in the first storage area target identification information for identifying the communication-target device as the default identification information, when a first network to which the communication-target device belongs is identical to a second network to which the information processing apparatus belongs via the second type interface section, the target identification information being stored in association with at least one of the plurality of attributes;
   acquiring communication execution information by executing the communication with the communication-target device via the first type interface section and communicating with the communication-target device via the second type interface section based on the acquired communication execution information, when the second network and the first network are different networks, the communication execution information being used upon communicating with the communication-target device via the second type interface section; and
   storing the target identification information in a second storage area of the storage, and deleting the stored target identification information from the second storage area in response to a particular condition being satisfied, when the second network and the first network are different networks and the acquired communication execution information is used for a temporary one time communicating, the target identification information being stored in the second storage area in association with at least one of the plurality of attributes, wherein:

the displaying includes displaying one or more identification information images indicating one or more specific target identification information on the display, the one or more specific target identification information being associated with the specific attribute designated in the attribute designation operation and stored in the second storage area; and the sending includes sending via the second type interface section, when the operation section receives the image designation operation for designating any one of the one or more identification information images displayed on the display, the command to the communication-target device identified by the specific target identification information corresponding to the identification information image designated in the image designation operation or to the default device identified by the default identification information corresponding to the identification information image designated in the image designation operation.

2. The non-transitory computer-readable storage medium according to claim 1, wherein the particular condition is a lapse of a particular set time from when the target identification information was stored in the second storage area.

3. The non-transitory computer-readable storage medium according to claim 1, wherein the particular condition is a termination of a communication with the communication-target device via the second type interface section.

4. The non-transitory computer-readable storage medium according to claim 1, wherein:

the communicating includes sending second network identification information for identifying the second network to the communication-target device based on communication via the first type interface section; and a determination that the first network is different from the second network is made when information indicating that the first network and the second network are different networks is received from the communication-target device via the first type interface section.

5. The non-transitory computer-readable storage medium according to claim 1, wherein:

the communicating includes acquiring first network identification information for identifying the first network from the communication-target device; and a determination that the first network is different from the second network is made when the first network identification information acquired by the communication with the communication-target device via the first type interface section and second network identification information for identifying the second network are different from each other.

6. The non-transitory computer-readable storage medium according to claim 1, wherein the first type interface section is an interface protocol for near field communication, and the second type interface section is an interface protocol for wireless LAN communication.

7. The non-transitory computer-readable storage medium according to claim 1, wherein the displaying of the one or more identification information images includes causing one or more identification information images indicating the one or more specific default identification information not to be displayed on the display, when one or more identification information images indicating one or more specific target identification information are displayed on the display.

8. An information processing apparatus comprising:

a storage;

a display;

an operation section;

a first type interface section configured to perform wireless communication in compliance with a first communication protocol;

a second type interface section configured to perform wireless communication in compliance with a second communication protocol different from the first communication protocol;

a processor; and a memory storing instructions, the instructions, when executed by the processor, causing the information processing apparatus to perform:

storing a first storage area of the storage, for each of a plurality of attributes, an association of the attribute and one or more default identification information for identifying one or more default devices, each of the one or more default devices being a device predetermined as a communication destination of the information processing apparatus;

displaying on the display, when the operation section receives an attribute designation operation for designating a specific attribute among the plurality of attributes, one or more identification information images indicating one or more default identification information being associated with the specific attribute and being stored in the first storage area;

sending via the second type interface section, when the operation section receives an image designation operation for designating a specific identification information image among the one or more identification information images displayed on the display, a command to a specific default device identified by specific default identification information corresponding to the specific identification information image designated in the image designation operation, the command being for executing processing according to the specific attribute designated in the attribute designation operation;

communicating with a communication-target device, which is a device with which the information processing apparatus is to communicate, via the first type interface section;

storing, in the first storage area, target identification information for identifying the communication-target device as the default identification information, when a first network to which the communication-target device belongs is identical to a second network to which the information processing apparatus belongs via the second type interface section, the target identification information being stored in association with at least one of the plurality of attributes;

acquiring communication execution information by executing the communication with the communication-target device via the first type interface section and communicating with the communication-target device via the second type interface section based on the acquired communication execution information, when the second network and the first network are different networks, the communication execution information being used upon communicating with the communication-target device via the second type interface section; and storing the target identification information in a second storage area of the storage, and deleting the stored target identification information from the second storage area in response to a particular condition being satisfied, when the second network and the first network are different networks and the acquired communication execution information is used for a temporary one time communicating, the target identification information being stored in the second storage area in association with at least one of the plurality of attributes, wherein:

the displaying includes displaying one or more identification information images indicating one or more specific target identification information on the display, the one or more specific target identification information being associated with the specific attribute designated in the attribute designation operation and stored in the second storage area; and the sending includes sending via the second type interface section, when the operation section receives the image designation operation for designating any one of the one or more identification information images displayed on the display, the command to the communication-target device identified by the specific target identification information corresponding to the identification information image designated in the image designation operation or to the default device identified by the default identification information corresponding to the identification information image designated in the image designation operation.

9. A method for controlling an information processing apparatus that comprises:

a storage;

a display;

an operation section;

a first type interface section configured to perform a-wireless communication based on a first communication protocol; and a second type interface section configured to perform a-wireless communication based on a second communication protocol different from the first communication protocol;

the method comprising:

storing a first storage area of the storage, for each of a plurality of attributes, an association of the attribute and one or more default identification information for identifying one or more default devices, each of the one or more default devices being a device predetermined as a communication destination of the information processing apparatus;

displaying on the display, when the operation section receives an attribute designation operation for designating a specific attribute among the plurality of attributes, one or more identification information images indicating one or more default identification information being associated with the specific attribute and being stored in the first storage area;

sending via the second type interface section, when the operation section receives an image designation operation for designating a specific identification information image among the one or more identification information images displayed on the display, a command to a specific default device identified by specific default identification information corresponding to the specific identification information image designated in the image designation operation, the command being for executing processing according to the specific attribute designated in the attribute designation operation;

communicating with a communication-target device, which is a device with which the information processing apparatus is to communicate, via the first type interface section;

storing in the first storage area, target identification information for identifying the communication-target device as the default identification information, when a first network to which the communication-target device belongs is identical to a second network to which the information processing apparatus belongs via the second type interface section, the target identification information being stored in association with at least one of the plurality of attributes;

acquiring communication execution information by executing the communication with the communication-target device via the first type interface section and communicating with the communication-target device via the second type interface section based on the acquired communication execution information, when the second network and the first network are different networks, the communication execution information being used upon communicating with the communication-target device via the second type interface section; and storing the target identification information in a second storage area of the storage, and deleting the stored target identification information from the second storage area in response to a particular condition being satisfied, when the second network and the first network are different networks and the acquired communication execution information is used for a temporary one time communicating, the target identification information being stored in the second storage area in association with at least one of the plurality of attributes, wherein:

the displaying includes displaying one or more identification information images indicating one or more specific target identification information on the display, the one or more specific target identification information being associated with the specific attribute designated in the attribute designation operation and stored in the second storage area; and the sending includes sending via the second type interface section, when the operation section receives the image designation operation for designating any one of the one or more identification information images displayed on the display, the command to the communication-target device identified by the specific target identification information corresponding to the identification information image designated in the image designation operation or to the default device identified by the default identification information corresponding to the identification information image designated in the image designation operation.

* * * * *